(12) United States Patent
Hwang

(10) Patent No.: US 11,839,341 B2
(45) Date of Patent: Dec. 12, 2023

(54) HIGH-PERFORMANCE ADHESIVE ROLL CLEANER

(71) Applicant: RaonTRM Co., Ltd., Hwaseong-si (KR)

(72) Inventor: Jae Ho Hwang, Daejeon (KR)

(73) Assignee: RAONTRM CO., LTD., Gyeonggi-do (KR)

( * ) Notice: Subject to any disclaimer, the term of this patent is extended or adjusted under 35 U.S.C. 154(b) by 532 days.

(21) Appl. No.: 17/166,113

(22) Filed: Feb. 3, 2021

(65) Prior Publication Data

US 2022/0211248 A1    Jul. 7, 2022

(30) Foreign Application Priority Data

Jan. 4, 2021  (KR) .................. 10-2021-0000351

(51) Int. Cl.
| | |
|---|---|
| *A47L 25/00* | (2006.01) |
| *B32B 5/02* | (2006.01) |
| *B32B 27/12* | (2006.01) |
| *B32B 27/28* | (2006.01) |
| *D04B 21/20* | (2006.01) |

(52) U.S. Cl.
CPC ............ *A47L 25/005* (2013.01); *B32B 5/026* (2013.01); *B32B 27/12* (2013.01); *B32B 27/283* (2013.01); *D04B 21/20* (2013.01); *B32B 2255/02* (2013.01); *B32B 2255/26* (2013.01); *B32B 2262/0253* (2013.01); *B32B 2262/062* (2013.01); *B32B 2432/00* (2013.01); *D10B 2201/02* (2013.01); *D10B 2321/021* (2013.01); *D10B 2321/022* (2013.01); *D10B 2503/00* (2013.01)

(58) Field of Classification Search
CPC ....... A47L 25/005; B32B 5/026; B32B 27/12; B32B 27/283; B32B 2255/02; B32B 2255/26; B32B 2432/00; D04B 21/20; D10B 2201/02; D10B 2321/021; D10B 2321/022; D10B 2503/00
USPC ...................................... 15/104.002
See application file for complete search history.

(56) References Cited

U.S. PATENT DOCUMENTS 2,621,393 A * 12/1952 Riding .................... A47L 13/16
15/209.1

FOREIGN PATENT DOCUMENTS

| ES | 2 281 595 | * 10/2007 |
| KR | 101031968 B1 | 4/2011 |
| KR | 101101228 B1 | 1/2012 |

(Continued)

*Primary Examiner* — Randall E Chin
(74) *Attorney, Agent, or Firm* — Hamre, Schumann, Mueller & Larson, P.C.

(57) ABSTRACT

The present invention relates to a high-performance adhesive roll cleaner including: an adhesive tape roll formed by winding an adhesive tape, having an adhesive layer formed on one surface of a warp-knitted fabric base layer, so that the adhesive layer faces outward; and a support body configured to rotatably support the adhesive tape roll; wherein the warp-knitted fabric base layer may be continuously cut at intervals of 2 mm. The present invention may provide remarkable advantages in that the adhesive tape may be easily cut at a desired position during use, and may be used repeatedly due to the excellent initial tack thereof, so that the economic efficiency thereof may be maximized while the waste thereof is prevented.

9 Claims, 2 Drawing Sheets

(56) References Cited

FOREIGN PATENT DOCUMENTS

KR 101756282 B1 7/2017

\* cited by examiner

FIG. 1 - Prior Art
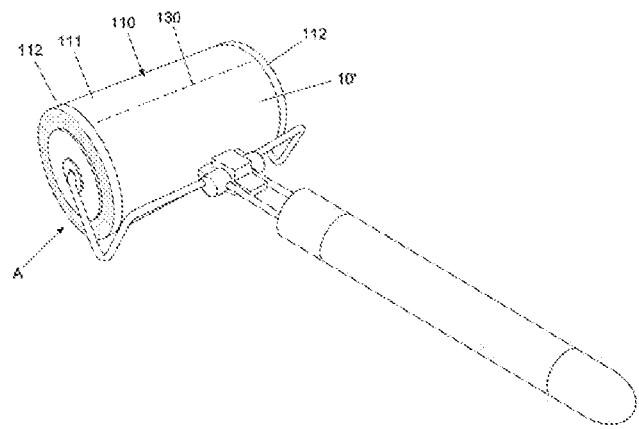
FIG. 2
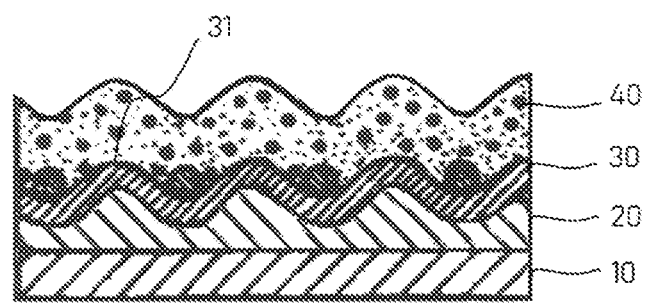

(a)                  (b)

HIGH-PERFORMANCE ADHESIVE ROLL CLEANER

CROSS-REFERENCE TO RELATED APPLICATION

This application claims the benefit of Korean Patent Application No. 10-2021-0000351 filed on Jan. 4, 2021, which is hereby incorporated by reference herein in its entirety.

BACKGROUND

1. Technical Field

The present invention relates to an adhesive roll cleaner for removing foreign substances such as dust and hair from bedding, clothing, carpets, and the like, and more particularly to a high-performance adhesive roll cleaner whose adhesive tape may be easily cut at any desired position during use and may be used repeatedly for a prolonged period of time due to its excellent initial tack.

2. Description of the Related Art

In general, adhesive roll cleaners are widely used because they are suitable for removing various foreign substances such as dust, hair, and fluff from the surfaces of textile products such as bedding, clothing, and carpets. In general, such an adhesive roll cleaner includes: an adhesive tape roll formed by winding an adhesive tape; a support roller inserted into the adhesive tape roll, and configured to support the adhesive tape roll; a support frame having both ends coupled to both ends of the support roller, respectively, and configured to support the support roller; and a grip having a front end connected to the support frame.

Referring to FIG. 1, the adhesive tape of this adhesive roll cleaner has cutting lines 130 formed at regular intervals. When the adhesive tape loses its adhesion due to foreign substances adhering thereto, only the adhesive layer corresponding to the adhesive tape portion having the foreign substances adhering thereto may be removed along the cutting line 130 so as to expose a fresh adhesive layer.

When the adhesive roll cleaner is used for fabric such as bedding, clothing or carpets, the adhesion thereof is decreased rapidly even when a small area of the fabric is rubbed with the adhesive roll cleaner. For this reason, the adhesive roll cleaner tends to be quite wasteful, even though it is not cheap. Meanwhile, since the adhesive roll cleaner including the adhesive tape roll having cutting lines formed therein should be used while the adhesive tape is cut along the cutting lines formed at regular intervals, the entire adhesive surface thereof should sometimes be removed even when a sufficient quantity of foreign substances do not adhere to the adhesive surface. In addition, the area of the wound surface becomes smaller toward the inside of the adhesive tape roll, and thus unused surfaces thereof may also be removed. For these reasons, a significant portion of the adhesive roll tape is wasted. Moreover, when foreign substances adhere to the adhesive surface, it is difficult to correctly identify the cutting direction before cutting, and a problem often occurs in that an adjacent fresh adhesive layer is also torn during cutting.

In addition, in the case of a conventional adhesive roll cleaner, the adhesive layer has a small area and strong adhesive strength, but has low initial tack. Accordingly, after the adhesive roll cleaner has been rolled once or twice during use, the used adhesive layer should be removed and discarded. For this reason, a problem arises in that the adhesive roll cleaner is significantly wasted, even though it is not cheap. Moreover, the adhesive layer has low adhesion to a base material, and thus, when it is incorrectly used, problems arise in that the adhesive is transferred to clothes or carpets and damages the clothes or carpets, and in that the adhesive residue contaminates floor surfaces.

Furthermore, as shown in FIG. 1, in a conventional adhesive roll cleaner, non-adhesive coated portions 112 are formed at the edge portions of both widthwise sides of the adhesive roll cleaner in order to solve the problem in which the adhesive leaks out of the sides of the adhesive roll cleaner. Accordingly, the conventional adhesive roll cleaner has limitations in that the entire width of the adhesive tape is not utilized, a portion of the adhesive tape is discarded and wasted, and furthermore, corners or edges that need to be cleaned due to a lot of accumulated dust or contaminants are impossible to clean with the adhesive roll cleaner.

RELATED ART DOCUMENTS

Patent Documents (Patent document 1) KR10-1101228 B
(Patent document 2) KR10-1031968 B
(Patent document 3) KR10-1756282 B

SUMMARY

The present invention has been conceived to overcome the above-described problems of the prior art, and an object of the present invention is to provide an adhesive roll cleaner having improved economic efficiency, which may be easily cut at a desired position by hand during use because a warp-knitted fabric base layer thereof, which has an adhesive layer formed thereon, has good tearability in the widthwise direction thereof.

Another object of the present invention is to provide an adhesive roll cleaner having improved economic efficiency, which overcomes the problem (low initial tack) of a conventional adhesive roller cleaner, and may be used repeatedly because it retains its initial tack even when it is used twice or three times more than the conventional adhesive roller cleaner.

Still another object of the present invention is to provide a safe adhesive roll cleaner which has a higher tack, better adhesion to a base material, and higher cohesion than a conventional adhesive roll cleaner, and thus does not cause damage from adhesive transfer to clothes or carpets during the use of the adhesive roll cleaner.

Yet another object of the present invention is to provide an adhesive roll cleaner which makes it possible to use the entire width of an adhesive tape thereof by eliminating the need to form non-coated portions in the adhesive tape, and which may completely clean even corners or edge portions.

One aspect of the present invention for achieving the above-described problems is directed to a high-performance adhesive roll cleaner including an adhesive tape roll and a support body configured to rotatably support the adhesive tape roll, wherein the adhesive tape roll includes:

a warp-knitted fabric base layer including a tricot warp-knitted fabric;
  a film support layer formed on one surface of the warp-knitted fabric base layer;
  an adhesive layer formed on a surface opposite to the one surface of the warp-knitted fabric base layer; and a release layer formed by applying a release agent to the surface of the film support layer;

wherein the adhesive layer contains: a modified acrylate-based copolymer obtained by mixing and polymerizing an acrylic monomer mixture and benzyl acrylate; and an aluminum chelate-based crosslinking agent.

The surface of the warp-knitted fabric base layer of the adhesive tape roll, on which the adhesive layer is formed, may include an embossed structure in which warp yarns and weft yarns are exposed as they are.

The acrylic monomer mixture may contain 10 to 12 parts by weight of 2-ethylhexyl acrylate, 15 to 20 parts by weight of butyl acrylate, 3 to 5 parts by weight of benzyl acrylate, 1 to 2 parts by weight of acrylic acid, and 2 to 3 parts by weight of 2-hydroxyethyl acrylate.

The adhesive layer may further contain 3 to 6 parts by weight of a rosin ester-based resin or a terpene phenol-based resin, and the adhesive layer may further contain 0.1 to 0.5 parts by weight of toluene diisocyanate.

The tricot warp-knitted fabric may be a fabric knitted with polyethylene or polypropylene flat yarns, or a fabric knitted with polyester-cotton blended yarns.

The warp-knitted fabric base layer may be a dyed fabric or may include a printed layer.

In the present invention, the warp-knitted fabric base layer may be continuously cut in the widthwise direction at intervals of 2 mm or less, and thus may be easily cut at any position by a user, so that it may be used as desired.

BRIEF DESCRIPTION OF THE DRAWINGS

The above and other objects, features and advantages of the present invention will be more clearly understood from the following detailed description taken in conjunction with the accompanying drawings, in which:

FIG. 1 is a schematic perspective view of a conventional adhesive roll cleaner;

FIG. 2 is a sectional view of an adhesive tape for an adhesive roll cleaner according to one embodiment of the present invention.

DETAILED DESCRIPTION

Figure 3:
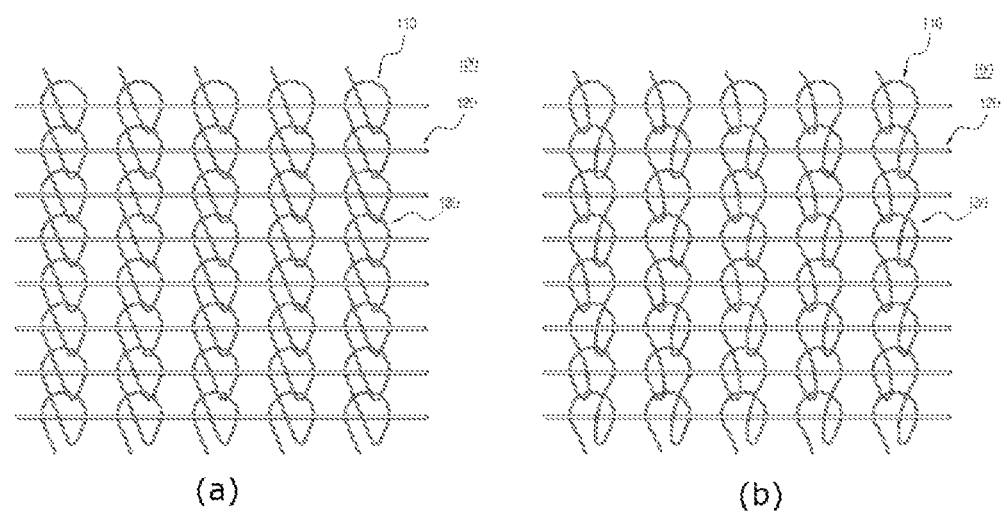
FIG. 3 shows the structure of the fabric of the adhesive tape for an adhesive roll cleaner according to one embodiment of the present invention.

The present invention will be described in detail below with reference to the accompanying drawings. Throughout the drawings, components having the same functions are designated by the same reference numerals. In addition, the embodiments shown in the drawings are schematically illustrated to clearly describe the present invention, and the size or scale of a product that is actually offered is not necessarily accurately expressed.

According to one embodiment of the present invention, there is provided a high-performance adhesive roller cleaner including: an adhesive tape roll formed by winding an adhesive tape, having an adhesive layer formed on one surface of a warp-knitted base layer, so that the adhesive layer faces outward; and a support body configured to rotatably support the adhesive tape roll; wherein the warp-knitted fabric base layer includes a tricot warp-knitted fabric which may be continuously cut at intervals of 2 mm or less.

FIG. 2 is a sectional view of an adhesive tape for an adhesive roll cleaner according to one embodiment of the present invention, and FIGS. 3(a) and 3(b) show the structure of the fabric of the adhesive tape for an adhesive roll cleaner according to one embodiment of the present invention.

Referring to FIG. 2, the adhesive tape according to one embodiment of the present invention includes: a film support layer 20; a tricot warp-knitted fabric 30 formed on the film support layer 20; and an adhesive layer 40 laminated on the upper surface of the tricot warp-knitted fabric 30. A release agent may be applied to a surface of the film support layer 20, which is opposite to the tricot knitted fabric 30, to form a release layer 10.

As shown in FIGS. 3(a) and 3(b), a tricot warp-knitted fabric 100 constituting a base material that is used in the high-performance adhesive roll cleaner includes a tricot warp-knitted fabric configured such that warp loop yarns 110 are twisted around weft insertion yarns 120. This tricot warp-knitted yarn may be obtained by knitting using a tricot warp knitting machine.

Referring to FIG. 3(a), in one embodiment of the present invention, the tricot warp-knitted fabric 100 includes: a plurality of warp loop yarns 110 composed of independent warp yarns and parallel in the vertical direction; and a plurality of weft insertion yarns 120 arranged orthogonal to the warp loop yarns 110. Each of the warp loop yarns 110 includes a plurality of cross loops 130 formed at equal intervals on the coaxial line in the vertical direction and having the same rotation direction. The weft insertion yarns 120 are inserted into the loops 130 of the warp loop yarns 110 across the entire widths of the warp loop yarns 110 so that the warp loop yarns 110 are twisted around the weft insertion yarns 120.

Referring to FIG. 3(b), the tricot warp-knitted fabric 100 of the present invention may have a structure in which a plurality of open loops 130 formed in the warp loop yarns 110 are formed in a zigzag pattern in the vertical direction, and the open loops 130 have opposite rotation directions.

In the high-performance adhesive roll cleaner of the present invention, the adhesive is prevented from leaking out of both sides of the adhesive tape, and thus non-adhesive coated portions need to be formed on both sides of the adhesive tape. Therefore, the adhesive roll cleaner of the present invention has remarkable advantages in that it may not only clean a larger area by utilizing the entire width of the adhesive tape, but also completely clean the corners or edges that urgently need to be cleaned due to the collection and accumulation of dust.

The film support layer 20 is formed on one surface of the tricot warp-knitted fabric 30, but an embossed structure 31 in which warp loop yarns and weft insertion yarns are exposed toward the adhesive layer 40 is formed on the opposite surface. Thus, various foreign substances on a target surface may strongly adhere to the adhesive roll cleaner of the present invention, and the excellent initial tack of the adhesive roll cleaner may be retained even after the adhesive roll cleaner is used repeatedly.

The tricot warp-knitted fabric 100 constituting the adhesive tape roll of the adhesive roll cleaner according to the present invention does not have a sliding phenomenon between the warp loop yarns 110 and the weft insertion yarns 120, and thus, even when a small force is applied for cutting of the adhesive tape, the adhesive tape may be easily cut continuously at intervals of 2 mm or less in the widthwise direction. In addition, the sectional plane appears clear and even, and thus the foreign substance-adsorbing performance of even the sectional plane is not adversely affected.

The tricot warp-knitted fabric 100 of the adhesive tape according to one embodiment of the present invention may have a structure in which the warp loop yarns 110 are composed of long filament yarns and the weft insertion yarns 120 are composed of long-fiber processed yarns such as polyester DTY yarns. Since the tricot warp-knitted fabric of the present invention includes long filament yarns as the warp loop yarns 100, it has excellent handling properties. Furthermore, since it is possible to obtain excellent strength using finer yarns than short fibers, the tricot warp-knitted fabric may be made thin. Moreover, since the long filament yarns have uniform fineness, an adhesive tape having a uniform adhesive surface may be manufactured when a fabric woven from the long filament yarns is used. In addition, the long-fiber processed yarns used as the weft insertion yarns 120 in one embodiment of the present invention have an advantage in that they have uniform fineness compared to short fibers and have an excellent ability to be woven with the long filament yarns. In the present invention, since the tricot warp-knitted fabric include long processed yarns as weft yarns, the surface frictional force of the weft yarns may increase, so that the weft yarns may be more reliably fixed to the loops formed in the warp yarns, thus preventing slippage between the warp yarns and weft yarns.

The material of the warp loop yarns 110 and the weft insertion yarns 120 according to the present invention may be polyester, polyamide, viscose rayon, acetate, polyurethane, or the like, but is not necessarily limited thereto.

In the present invention, the tricot warp-knitted fabric may be a tricot warp-knitted fabric obtained by knitting polyethylene or polypropylene flat yarns, or may be a tricot warp-knitted fabric obtained by knitting polyester-cotton blended yarns (e.g., toplon cotton yarns).

The densities of the warp yarns and the weft yarns may be appropriately adjusted, but are preferably 12 to 24 yarns/inch for the warp yarns and 22 to 40 yarns/inch for the weft yarns. If any one of the warp yarn density and the weft yarn density is excessively low, it may be difficult to ensure the strength of the tricot warp-knitted fabric. In contrast, if the warp yarn and weft yarn densities are excessively high, the strength of the tricot warp-knitted fabric may be ensured, but the numbers of warp and weft yarns inserted may increase, resulting in a decrease in productivity.

A film support layer 20 is formed on one surface of the warp-knitted fabric base layer 30. Examples of the material of the film support layer 20 include films of resins such as polyester-based resin, cellulose-based resin, acetate-based resin, polyether sulfone-based resin, polycarbonate-based resin, polyamide-based resin, polyimide-based resin, polyolefin-based resin, and acrylic resin. Among the above resins, polyolefin-based resin is preferred. The film support layer 20 may also be a stretched material. In general, the thickness of the film support layer 20 is 500 μm or less, preferably 10 to 200 μm. The film support layer 20 may be colored or transparent.

The pressure-sensitive adhesive constituting the pressure-sensitive adhesive layer 40 in the present invention is advantageously, for example, an acrylic adhesive. The adhesive layer 40 contains: a modified acrylate-based copolymer obtained by mixing and polymerizing an acrylic monomer mixture and benzyl acrylate; and an aluminum chelate-based crosslinking agent.

The adhesive layer 40 of the adhesive roll cleaner of the present invention is characterized in that it contains the special monomer benzyl acrylate for realization of an adhesive having high initial tack while having high adhesion to the base material and high cohesion.

The initial tack of the adhesive constituting the adhesive layer 40 is ensured by introducing a carboxyl group and a hydroxyl group into the polymer of the acrylic adhesive, and allowing the carboxyl group to react with an aluminum chelate among chelates, and a urethane-forming reaction is induced by a crosslinking reaction between the hydroxyl group and toluene diisocyanate that is a polyisocyanate.

As the crosslinking agent in the present invention, an aluminum chelate-based crosslinking agent, which is a chelate-based crosslinking agent, and a toluene diisocyanate crosslinking agent, which is an isocyanate-based crosslinking agent, are preferably used. Other isocyanate-based crosslinking agents and chelate-based crosslinking agents may also be used in combination.

Specific examples of the aluminum chelate-based crosslinking agent include, but are not necessarily limited to, aluminum tris(acetylacetonate), aluminum tris(ethylacetoacetate), aluminum monoacetylacetonate bis(ethylacetoacetate), aluminum monoacetylacetonate bisoleyl acetoacetate, ethylacetoacetate aluminum diisopropylate, and alkyl acetoacetate aluminum diisopropylate.

Other chelate-based crosslinking agents include titanium acetylacetonate, zirconium acetylacetonate, and the like. Specific examples of the other isocyanate-based crosslinking agents include toluene diisocyanate, naphtha-1,5-diisocyanate, hexamethylene diisocyanate, diphenylmethane diisocyanate, xylene diisocyanate, trimethylolpropane-modified toluene diisocyanate, and the like.

The modified acrylate-based copolymer may be obtained by mixing 5 to 100 parts by weight of benzyl acrylate with 100 parts by weight of the acrylic monomer mixture.

The acrylic monomer mixture may contain, for example, 10 to 12 parts by weight of 2-ethylhexyl acrylate, 15 to 20 parts by weight of butyl acrylate, 3 to 5 parts by weight of benzyl acrylate, 1 to 2 parts by weight of acrylic acid, and 2 to 3 parts by weight of 2-hydroxyethyl acrylate.

The adhesive layer 40 may further contain 3 to 6 parts by weight of a rosin ester resin or a terpene phenol resin as a tackifier. These tackifiers may be used alone or in combination. As the tackifier, a hydrocarbon-based resin, a rosin-based resin, a terpene-based resin, a polymerized rosin resin, and a polymerized rosin ester resin may be used alone or in combination of two or more. The tackifier resin is preferably contained in an amount of 3 to 6 parts by weight based on 100 parts by weight of the acrylate-based copolymer. Where the content of the tackifier resin is within the above range, it is more preferable in terms of improving the compatibility and cohesion of the adhesive.

The adhesive layer 40 may contain, as a multifunctional crosslinking agent, an isocyanate-based compound, an epoxy-based compound, an aziridine-based compound, or a metal chelate-based compound. In particular, an isocyanate-based crosslinking agent is preferably used. The isocyanate-based compound that is used in the present invention may be toluene diisocyanate, xylene diisocyanate, diphenylmethane diisocyanate, hexamethylene diisocyanate, isoform diisocyanate, tetramethylxylene diisocyanate, naphthalene diisocyanate, or a reaction product thereof with a polyol such as trimethylolpropane. The multifunctional crosslinking agent described above is preferably contained in an amount of 0.1 to 0.5 parts by weight based on 100 parts by weight of the modified acrylate-based copolymer. Where the content of the multifunctional crosslinking agent is within the above range, the adhesive has excellent cohesion, does not pose adhesion durability problems such as bubbles or peeling, and does not exfoliate, indicating that the adhesive has excellent durability and reliability.

In the present invention, the weight-average molecular weight of the modified acrylate-based copolymer is preferably 500,000 or more, more preferably 600,000 to 3,000,000, most preferably 700,000 to 2,500,000. When the weight-average molecular weight is less than 500,000, the durability of the copolymer may be insufficient.

In the present invention, the production of the modified acrylate-based copolymer may be performed using a known appropriate production method selected among solution polymerization, bulk polymerization, emulsion polymerization, and various radical polymerization methods. Furthermore, the obtained (meth)acrylate-based copolymer may be any of a random copolymer, a block copolymer, and a graft copolymer.

Solution polymerization is performed using a polymerization solvent such as ethyl acetate or toluene. As a specific example of solution polymerization, the polymerization reaction may be performed at 50 to 70° C. for about 8 to 30 hours in the presence of a polymerization initiator such as azobis(isobutyronitrile), added in an amount of, for example, 0.01 to 0.2 parts by weight based on 100 parts by weight of the total weight of monomers, under an inert gas atmosphere such as nitrogen.

During polymerization, a thermal initiator may be used. For example, an azo-based thermal initiator such as azobisnitrile, or a peroxide initiator such as benzoyl peroxide or acetyl peroxide, may be used. These initiators may be used alone or in combination of two or more.

In the present invention, the adhesive composition for forming the adhesive layer may contain other known additives. For example, the adhesive composition may contain additives appropriately selected from among powders such as a colorant and a pigment, a dye, a surfactant, a plasticizer, a surface lubricant, a leveling agent, a softener, an antioxidant, an anti-aging agent, a light stabilizer, a UV absorber, and the like.

In the present invention, the method of forming the adhesive layer 40 is not particularly limited, and the adhesive layer 40 may be formed by a roll coating method, a kiss roll coating method, a gravure coating method, a reverse coating method, a roll brushing method, a spray coating method, a dip roll coating method, a bar coating method, a knife coating method, an air knife coating method, or an extrusion coating and wet coating method using a die coater or the like.

In the adhesive tape of the adhesive roll cleaner of the present invention, in order to improve the unwinding performance of the adhesive tape wound into the adhesive tape roll, a release layer 10 may be formed by applying a release agent to the back surface of the adhesive tape. In the present invention, in order to solve the problem that the adhesive of the adhesive layer leaks out of the sides of the adhesive tape roll, an acrylic adhesive having good cohesion and weather resistance may be used. In this case, the adhesion, release force, and backside adhesion of the adhesive tape are adjusted so that the adhesive tape is not excessively easily unwound.

A release agent is a coating material that prevents or reduces adhesion to a material. In the present invention, a release layer is formed by applying a release agent to the outer surface of the film support layer. The release layer improves the unwinding performance of the adhesive tape wound into a roll.

As a preferred release agent that is used for the release layer 10, a silicone-based release agent may be used. For example, a crosslinkable silicone-based release agent system may be used. Examples thereof include mixtures of crosslinking catalysts and what are known as heat-curable condensation- or addition-crosslinking polysiloxanes. Examples of the silicone-based release agent include, but are not necessarily limited to, those selected from the group consisting of silicone, silicon fluoride, silicone copolymers, and combinations of two or more thereof.

Release agents may include solvent-containing and/or solvent-free systems, in which case solvent-free systems are preferred. The release agent may be radiation-crosslinking, condensation-linking or addition-crosslinking; preferably it is addition-crosslinking.

The release layer 10 may be formed to have a thickness of preferably 0.1 to 5.0 μm, more preferably 0.2 to 2.5 μm, even more preferably 0.6 to 1.8 μm.

In the present invention, in order to realize an adhesive roll cleaner having various colors, a fabric may be given various colors by dyeing it with colored pigments or dyes during the manufacturing of the fabric.

In the present invention, the adhesive tape roll is a conventional roll-type adhesive tape cleaner having an adhesive tape wound on the surface thereof. The adhesive tape roll may rotate about the longitudinal direction of the support roller of the support body. Thus, when the adhesive tape roll is rotated during the use of the adhesive roll cleaner, foreign substances such as dust and hair may be removed by adhesion to the surface of the adhesive layer of the adhesive tape. However, in the case of the adhesive roll cleaner of the present invention, when the adhesion of the adhesive tape roll decreases due to the use thereof, foreign substances may be removed by cutting the adhesive tape of the adhesive tape roll, which has the foreign substances attached thereto, to a desired length so as to expose a fresh adhesive layer, unlike the case of conventional adhesive roll cleaners.

The present invention will be described in more detail with reference to examples below. However, these examples serve merely illustrate preferred examples of the present invention, and the scope of the present invention should not be construed as being limited by these examples in any way. In addition, in the following examples, "parts" and "%" are by weight.

Example 1

Production of Adhesive Composition

As an adhesive for an adhesive layer material, an acrylic monomer mixture containing 2-ethylhexyl acrylate, butyl acrylate, benzyl acrylate, acrylic acid, and 2-hydroxyethyl acrylate was introduced into a reactor, and azobisnitrile as a thermal initiator was introduced, and then 120 parts by weight of ethyl acetate (EA) as a solvent was introduced into the reactor. Next, the reactor was purged with nitrogen gas for 60 minutes to remove oxygen, and then maintained at a temperature of 60° C. After the mixture was homogenized, 0.03 parts by weight of azobisisobutyronitrile (AIBN) as a reaction initiator was diluted in ethyl acetate at a concentration of 45% and added to the mixture, followed by reaction for 8 hours. After the reaction, the reaction product was diluted with ethyl acetate, thereby producing a high-molecular-weight (meth)acrylate-based copolymer having a solid content of 17 wt %.

Production of Adhesive Roll Cleaner

Using a tricot warp-knitted fabric configured such that warp loop yarns were twisted around weft insertion yarns, a warp knit base layer was prepared. After a polyethylene resin composition was applied to one surface of the warp-knitted substrate layer, and then dried in a drying device to remove the solvent, thereby forming a film support layer. A release layer was formed by applying a release agent to a surface of the surface support layer, on which an adhesive layer was not formed. An adhesive composition was coated into a surface of the film support layer, on which the film support layer was not formed, and then the adhesive layer was dried in a hot-air circulation dryer at 120° C. for 2 minutes to form an adhesive layer, thereby producing an adhesive roll cleaner. The physical properties of the produced adhesive material were measured by the methods described below, and the results of the measurement are shown in Table 1 below.

In Table 1 below, the content of each component is in units of parts by weight.

Examples 2 and 3 and Comparative Examples 1 to 4

High-molecular-weight (meth)acrylate-based copolymers were produced in the same manner as in Example 1, except that the components shown in Table 1 below were used at the composition ratio shown in Table 1.

Test Example: Methods for Evaluating Physical Properties of Adhesive Materials The physical properties of the adhesive roll cleaners produced in the Examples and the Comparative Examples were evaluated by the following methods, and the results of the evaluation are shown in Table 1 below.

1) Adhesion

A release film was laminated on each of the adhesive tapes, and then each adhesive tape was aged by storage at a temperature of 43° C. for 3 days. Next, each adhesive tape was attached to glass and tested for its adhesion. After glass to be used for measurement of the adhesion was washed clean with ethyl acetate (EA), each prepared specimen was attached to the glass using a 2-kg roller and then left to stand at room temperature (a temperature of 25° C. and a relative humidity of 50%) for 1 hour. The measurement of the adhesion was performed using a tensile tester at a peel angle of 180° and a peel rate of 0.3 m/min.

2) Initial Tack

The initial tack (ball tack) of each of the adhesive roll cleaners produced in Examples 1 and 2 and Comparative Examples 1 to 4 was measured according to the KSA 1107 standard. When a steel ball that rolled a length of 100 cm stopped between 30 mm to 70 mm from the beginning of the formed exposed adhesive surface while passing through the adhesive surface, the number of the steel ball was measured as the intensity of ball tack.

3) Leakage of Adhesive

The adhesive-coated tricot warp-knitted fabric produced in each of Examples 1 to 3 and Comparative Examples 1 to 4 was cut in the longitudinal direction using a cutter, and then the sectional plane of each tricot warp-knitted fabric was observed with a microscope, and the leakage of the adhesive was evaluated based on the following criteria.

○: the degree of leakage of the adhesive on the sectional plane is good at less than 0.2 mm Δ: the degree of leakage of the adhesive on the sectional plane is slightly poor at 0.2 to 0.5 mm X: the degree of leakage of the adhesive on the sectional plane is severe at more than 0.5 mm

TABLE 1

| | | Example 1 | Example 2 | Example 3 | Comp. Example 1 | Comp. Example 2 | Comp. Example 3 | Comp. Example 4 |
|---|---|---|---|---|---|---|---|---|
| | 2-EHAM | 12 | 12 | 12 | 12 | 12 | 13 | 13 |
| | BA | 16 | 16 | 16 | 20 | 20 | 19 | 19 |
| | BZA | 4 | 4 | 4 | 0 | 0 | 0 | 0 |
| | AA | 1 | 1 | 1 | 1 | 2 | 1 | 2 |
| | 2-HEA | 2 | 2 | 2 | 2 | 1 | 3 | 1 |
| Thermal initiator | AIBN | 0.1 | 0.1 | 0.1 | 0.1 | 0.1 | 0.1 | 0.1 |
| Curing agent | Aluminum chelate | 0.01 | 0.01 | 0.01 | 0.01 | 0.01 | 0.01 | 0.01 |
| | TDI | 0.02 | 0.02 | 0.02 | 0.02 | 0.02 | 0.02 | 0.02 |
| Solvent | EAc | 60 | 60 | 60 | 60 | 60 | 60 | 60 |
| Tackifier | Rosin ester | 0 | 5 | 0 | 5 | 0 | 5 | 0 |
| | Terpene phenol | 0 | 0 | 5 | 0 | 5 | 0 | 5 |
| Physical properties | Room-temperature adhesion (gf/25 mm) | 300 | 320 | 340 | 540 | 360 | 550 | 320 |
| | Initial tack (ball tack No.) | 21 | 24 | 23 | 8 | 7 | 10 | 11 |
| | Leakage of adhesive | ○ | ○ | ○ | X | X | X | Δ |

2-EHAM: 2-ethylhexyl actylate
BA: butyl actylate
BZA: benzyl actylate
2-HEA: 2-hydroxyethyl actylate
AA: acrylic acid
AIBN: azobisisobutyremitrile
TDI: toluene diisocyanate
EAc: ethyl acetate As shown in Table 1, Examples 1 and 2 exhibited very excellent properties in terms of initial tack as well as adhesion at room temperature, and the adhesive rarely leaked out of the sides in the width direction during cutting of the tricot warp-knitted fabric of each of Examples 1 and 2. Meanwhile, it was confirmed that the adhesion at room temperature of each of Comparative Examples 1 to 4 was similar to that of the adhesive roll cleaner of the present invention, but the initial tack thereof was significantly lower than that of the present invention, and the adhesive leaked out during the tricot warp-knitted fabric of each of Comparative Examples 1 to 4. As described above, when the initial tack is low, problems arise in that, after the exposed adhesive layer of the adhesive roll cleaner has been used once by rolling on clothing or floors, it may not be used anymore due to the loss of adhesion thereof, and the next fresh adhesive layer needs to be used.

As described above, since the adhesive roll cleaner of the present invention includes a tricot warp-knitted fabric as an adhesive tape base material, it is possible for a user to remove only a contaminated portion of the adhesive tape of the adhesive roll cleaner by a desired with (1 to 2 mm). Thus, the adhesive roll cleaner of the present invention overcomes the problem of removing a fixed amount of the adhesive tape using the cutting lines regardless of use, which is the problem of a conventional adhesive roll cleaner.

In addition, the present invention overcomes the problem of a conventional adhesive roll cleaner which is possible to use only after an unused portion is also removed in the inside of the adhesive tape roll, due to the cutting lines formed at regular intervals. Thus, the present invention provides a remarkable effect that allows a user to utilize all portions of the product without wasting the product.

In addition, the present invention overcomes the problem of a conventional adhesive roll cleaner which needs to be torn away and discarded after being used once or twice. Thus, the present invention provides a remarkable advantage in that the product may be additionally used without being wasted because the adhesion thereof is retained without being lost even when it is used twice or three times more than the conventional adhesive roller cleaner.

In addition, the adhesive roll cleaner of the present invention overcomes the problem of a conventional adhesive roll cleaner which contaminates clothing, carpets or floors by leaving residue on the clothing, carpets or floors because the adhesive of the conventional adhesive roll cleaner has low adhesion to the base material and low cohesion.

According to the present invention, it is not necessary to form non-coated portions on the edges of both sides of the adhesive tape, and thus the entire width of the adhesive tape may be utilized, thereby providing a remarkable advantage of being able to clean the corners or edges that necessarily need to be cleaned.

According to another embodiment of the present invention, the use of a colored fabric may provide an advantage in that adsorption and removal of colorless or transparent foreign substances may be easily checked with the naked eye.

The present invention described above is not limited to the above-described embodiments and the accompanying drawings, and it is to be understood that various modifications and alterations made by those skilled in the art without departing from the spirit and scope of the present invention as defined in the appended claims are also included within the scope of the present invention.

What is claimed is:

1. A high-performance adhesive roll cleaner comprising an adhesive tape roll and a support body configured to rotatably support the adhesive tape roll, wherein the adhesive tape roll comprises:
    a warp-knitted fabric base layer including a tricot warp-knitted fabric;
    a film support layer formed on one surface of the warp-knitted fabric base layer;
    an adhesive layer formed on a surface opposite to the one surface of the warp-knitted fabric base layer; and
    a release layer formed by applying a release agent to a surface of the film support layer; and
    wherein the adhesive layer comprises: a modified acrylate-based copolymer obtained by mixing and polymerizing an acrylic monomer mixture and benzyl acrylate; and an aluminum chelate-based crosslinking agent.

2. The high-performance adhesive roll cleaner of claim 1, wherein the surface of the warp-knitted base layer of the adhesive tape roll, on which the adhesive layer is formed, comprises an embossed structure in which warp yarns and weft yarns are exposed as they are.

3. The high-performance adhesive roll cleaner of claim 1, wherein the acrylic monomer mixture contains 10 to 12 parts by weight of 2-ethylhexyl acrylate, 15 to 20 parts by weight of butyl acrylate, 3 to 5 parts by weight of benzyl acrylate, 1 to 2 parts by weight of acrylic acid, and 2 to 3 parts by weight of 2-hydroxyethyl acrylate.

4. The high-performance adhesive roll cleaner of claim 1, wherein the adhesive layer further comprises 3 to 6 parts by weight of a rosin ester-based resin or a terpene phenol-based resin.

5. The high-performance adhesive roll cleaner of claim 1, wherein the adhesive layer further comprises 0.1 to 0.5 parts by weight of toluene diisocyanate.

6. The high-performance adhesive roll cleaner of claim 1, wherein the tricot warp-knitted fabric is a fabric knitted with polyethylene or polypropylene flat yarns, or a fabric knitted with polyester-cotton blended yarns.

7. The high-performance adhesive roll cleaner of claim 1, wherein the warp-knitted fabric base layer is a dyed fabric or comprises a printed layer.

8. The high-performance adhesive roll cleaner of claim 1, wherein the warp-knitted fabric base layer is continuously cut in a widthwise direction at intervals of 2 mm or less.

9. The high-performance adhesive roll cleaner of claim 1, wherein the film support layer comprises a polyethylene film or a polypropylene film.

* * * * *